(12) United States Patent
Genani

(10) Patent No.: US 12,263,131 B2
(45) Date of Patent: Apr. 1, 2025

(54) FORCE-BALANCING SUPPORT, MECHANICAL APPARATUS AND WEARABLE SUPPORT DEVICE

(71) Applicant: Skel-Ex Holding B.V., Rotterdam (NL)

(72) Inventor: Gaurav Narayan Genani, Rotterdam (NL)

(73) Assignee: Skel-Ex Holding B.V., Rotterdam (NL)

( * ) Notice: Subject to any disclaimer, the term of this patent is extended or adjusted under 35 U.S.C. 154(b) by 1144 days.

(21) Appl. No.: 16/390,646

(22) Filed: Apr. 22, 2019

(65) Prior Publication Data

US 2019/0240102 A1  Aug. 8, 2019

Related U.S. Application Data

(63) Continuation-in-part of application No. PCT/IB2016/056355, filed on Oct. 21, 2016.

(51) Int. Cl.
*A61H 1/02* (2006.01)
*B25J 9/00* (2006.01)
*B25J 19/00* (2006.01)

(52) U.S. Cl.
CPC ......... *A61H 1/0281* (2013.01); *A61H 1/0274* (2013.01); *B25J 9/0006* (2013.01); *B25J 19/0016* (2013.01); *A61H 2201/12* (2013.01); *A61H 2201/1215* (2013.01); *A61H 2201/1621* (2013.01); *A61H 2201/163* (2013.01);
(Continued)

(58) Field of Classification Search
CPC ............... A61H 1/0281; A61H 1/0274; A61H 2201/12; A61H 2201/1215; A61H 2201/1621; A61H 2201/163; A61H 2201/1638; A61H 2201/1652; B25J 9/0006; B25J 19/00016
See application file for complete search history.

(56) References Cited

U.S. PATENT DOCUMENTS

| 420,178 A | 1/1890 | Yagn |
| 5,845,540 A | 12/1998 | Rosheim |
| 6,301,526 B1 | 10/2001 | Kim et al. |

(Continued)

FOREIGN PATENT DOCUMENTS

| ES | 2370895 | 12/2011 |
| KR | 1020120130975 | 12/2012 |

(Continued)

*Primary Examiner* — Jerrah Edwards
*Assistant Examiner* — Aren Patel
(74) *Attorney, Agent, or Firm* — Peacock Law P.C.; Justin R. Jackson; Daniel Berenger-Russell

(57) ABSTRACT

To support a movable arm attached to a base and rotatable around a movable rotation point relative to the base, a force-balancing support comprises an arm attachment connectable to the movable arm and at least rotatable around a center of rotation of which a position is movable relative to the base attachment. The support is attachable to the base with a base attachment at a distance from the arm attachment. The support has a cantilever mechanism which transfers force exerted on the arm attachment by the movable arm, when coupled thereto, to the base attachment. The cantilever mechanism has a fixed end attached to the base attachment and a free, arm-side, cantilever end movable, e.g. by suitable flexing. The arm attachment is suspended with respect to the base attachment at the free end.

21 Claims, 4 Drawing Sheets

(52) U.S. Cl.
CPC ............... *A61H 2201/1638* (2013.01); *A61H 2201/1652* (2013.01)

(56) References Cited

U.S. PATENT DOCUMENTS

| | | |
|---|---|---|
| 6,539,333 B1 | 3/2003 | Metelski |
| 7,553,266 B2 | 6/2009 | Abdoli-Eramaki |
| 8,641,782 B2 | 12/2014 | Kim et al. |
| 9,205,017 B2 | 12/2015 | Doyle |
| 9,375,325 B2 | 6/2016 | Garrec et al. |
| 9,427,865 B2 | 8/2016 | Doyle |
| 2007/0080275 A1 | 4/2007 | Stachowski et al. |
| 2012/0101419 A1* | 4/2012 | Bonutti ................ A61F 5/013 602/20 |
| 2012/0184880 A1 | 7/2012 | Doyle |
| 2012/0330198 A1 | 12/2012 | Patoglu |
| 2014/0033391 A1* | 2/2014 | Doyle ................ A61F 5/3746 2/16 |
| 2014/0158839 A1* | 6/2014 | Doyle ................ A61F 5/013 248/118 |
| 2016/0081871 A1 | 3/2016 | Doyle |
| 2016/0096268 A1 | 4/2016 | Genani |
| 2017/0224517 A1* | 8/2017 | Doyle ................ A61F 5/013 |
| 2019/0350794 A1* | 11/2019 | Angold ................ A61H 1/0277 |
| 2020/0146923 A1* | 5/2020 | Doyle ................ A61H 1/0281 |
| 2020/0179213 A1* | 6/2020 | Krumholz ................ A61F 2/54 |

FOREIGN PATENT DOCUMENTS

| | | |
|---|---|---|
| WO | 2010/101595 | 9/2010 |
| WO | 2012/154580 | 11/2012 |
| WO | 2014/200343 | 12/2014 |
| WO | 2015/099858 | 7/2015 |
| WO | 2018/073629 | 4/2018 |

* cited by examiner

FORCE-BALANCING SUPPORT, MECHANICAL APPARATUS AND WEARABLE SUPPORT DEVICE

CROSS-REFERENCE TO RELATED APPLICATIONS

This application is a continuation-in-part application of International Patent Application No. PCT/IB2016/056355, titled "FORCE-BALANCING SUPPORT, MECHANICAL APPARATUS AND WEARABLE SUPPORT DEVICE", filed on Oct. 21, 2016, and the specification and claims thereof are incorporated herein by reference.

BACKGROUND OF THE INVENTION

Field of the Invention

This invention relates to a force-balancing support for a movable arm. The invention further relates to a mechanical apparatus and a wearable support device using such a force-balancing support.

Background of the Invention

Force balancing supports for movable arms, such as of human beings, are known. Such supports can for instance be used in exoskeletons and orthoses to compensate for, e.g. gravitational, forces acting on parts of the arm, or parts of the body supporting the arm, such as the upper back.

Referring to FIGS. 1 and 2, a human user 1 of a wearable support device is shown performing a physical task, in this example using a tooling equipment 2, such as an angle grinder, which involves a complex movement of one or both of the human arms 11 relative to the body 10. As illustrated, gravitational force $F_g$ and other forces e.g. such as those exerted by the tool 2, illustrated with arrows $F_x, F_y, F_z$, act on the arms 11 and are hence transferred to the parts of the body 10 maintaining the user upright. These forces thus present a musculoskeletal load to e.g. shoulders, upper and lower back.

Such a load can have a negative impact. Especially, prolonged or repetitive, working in the front or overhead is a common problem which often leads to shoulder or back complaints and injuries. Overhead tool balancers do provide some relief, but are impractical in many scenarios, such as in constrained spaces. Moreover, workers still have to hold their arms up while working, which in itself is cumbersome and could lead to musculoskeletal injuries over a period of time. Many wearable exoskeletons are being developed to provide a support that alleviates, but these still have several limitations.

For example, from International patent application publication number WO2014/200343 a device is known which provides a counterbalancing force. The device comprises a rigid frame to which an arm assembly is attached, and which can be worn by a user to provide a balancing force to the arms of the user. The frame comprises a first pivot point that pivotably connects a rigid first arm member of the arm assembly to the frame. The arm assembly further comprises a rigid second arm member and a second pivot point connecting the second arm member to the first arm member.

However, a disadvantage of this and other known supports is that they do not provide sufficient freedom of movement to the movable arm. Depending on the type of support, this can be caused because this movement is constrained by electric motors or other active actuators that drive the weigh balancing support and e.g. provide the counterbalancing force.

The lack of freedom of movement for the movable arm can also be caused by the mechanical construction of the support. For instance, in the afore mentioned publication, although the second pivot point will pivot when the first arm member rotates around the first pivot point, the type of movement is limited to a rotational movement and is constrained to the plane of rotation of the first arm member, which is set by the first pivot point on the rigid frame, parallel to the back of the user. Accordingly, movement of the arm supported by the device is limited as well and complex movements such as bending and torso torsion are cumbersome, if possible at all.

This limitation of freedom of movement is not only problematic in case the support is for an arm of a human being, but more generally for other types of movable arms, such as robots or other powered or non-powered mechanical apparatuses, that need to be able to perform complex movements.

BRIEF SUMMARY OF THE INVENTION

The present invention provides a force balancing support, a mechanical apparatus and a wearable support device as described in the accompanying claims.

Specific embodiments of the invention are set forth in the claims.

These and other aspects of the invention will be apparent from and elucidated with reference to the embodiments described hereinafter.

Further scope of applicability of the embodiments of the present invention will be set forth in part in the detailed description to follow, taken in conjunction with the accompanying drawings, and in part will become apparent to those skilled in the art upon examination of the following, or may be learned by practice of the invention. The objects and advantages of the embodiments of the present invention may be realized and attained by means of the instrumentalities and combinations particularly pointed out in the appended claims.

BRIEF DESCRIPTION OF THE SEVERAL VIEWS OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

In the following, details will not be explained in any greater extent than that considered necessary as illustrated above, for the understanding and appreciation of the underlying concepts of the present invention and in order not to obfuscate or distract from the teachings of the present invention.

Figure 1:
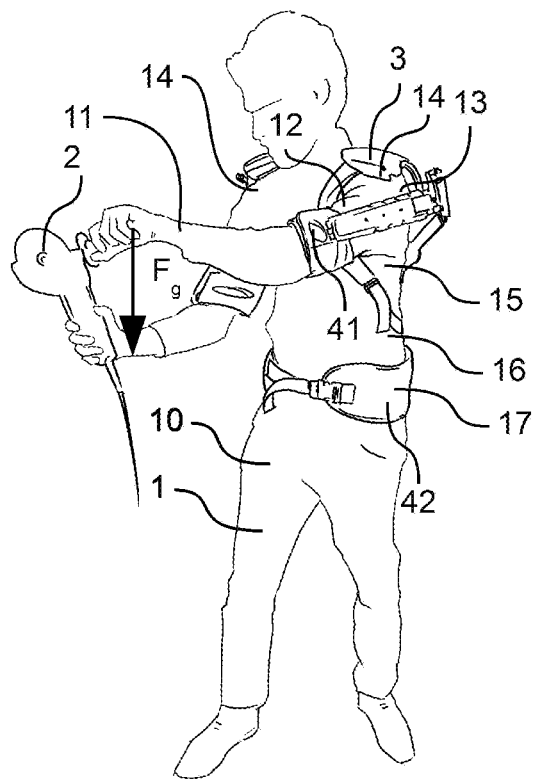
FIGS. 1 and 2 schematically show perspective views of a human user wearing an example of a wearable support device, illustrating a movement of an arm and the use of the wearable support device according to one embodiment of the present invention.
Figure 2:
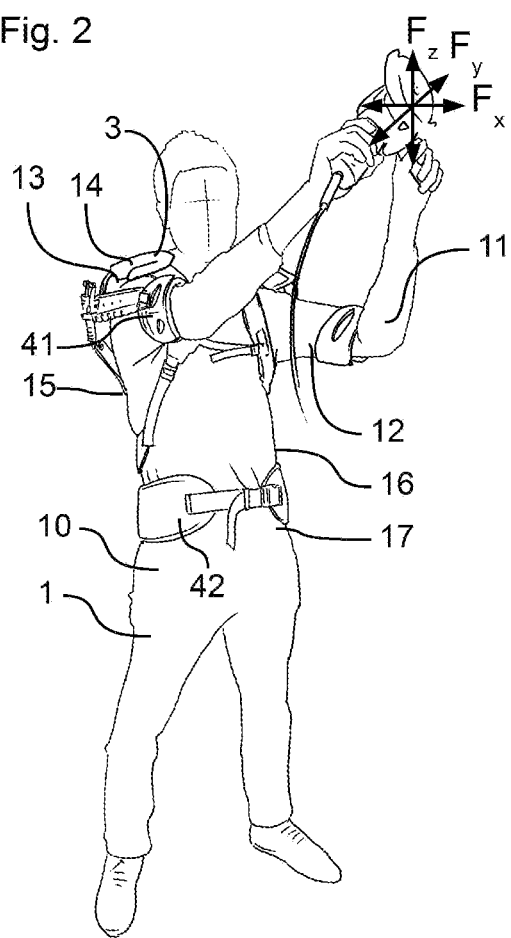

As mentioned in the section "Background of the invention", the known wearable support devices have a limited freedom of movement and are not capable of following complex movements. In FIGS. 1 and 2, for example, when performing the task, the upper arm 12 of the user 1 does not just rotate around its rotation point 13, i.e. the shoulder joint 13, but the center of rotation of the shoulder joint 13 moves e.g. relative to the hips 17 of the user through a complex movement of the shoulders 14, upper 15 and the lower back 16.

Figure 4:
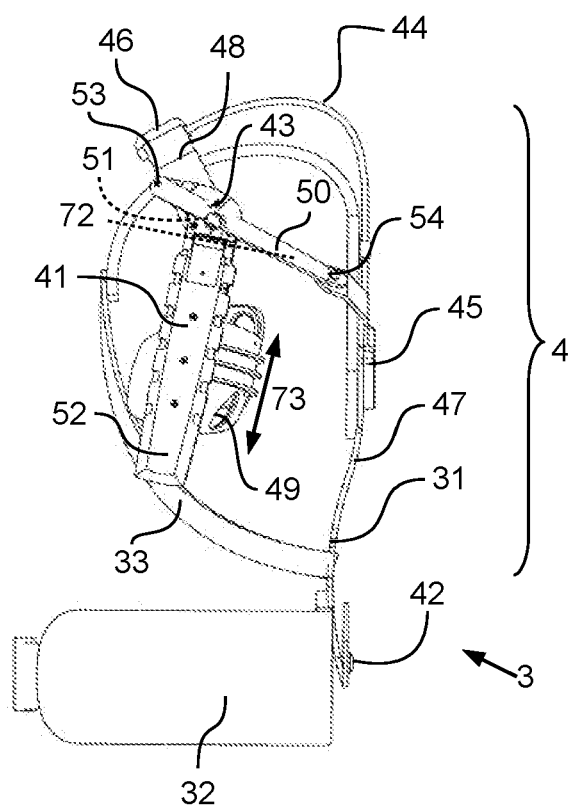
FIG. 4 schematically shows a side-view of an example of an embodiment of a wearable support device with an example of an embodiment of a force-balancing support according to one embodiment of the present invention.
Figure 5:
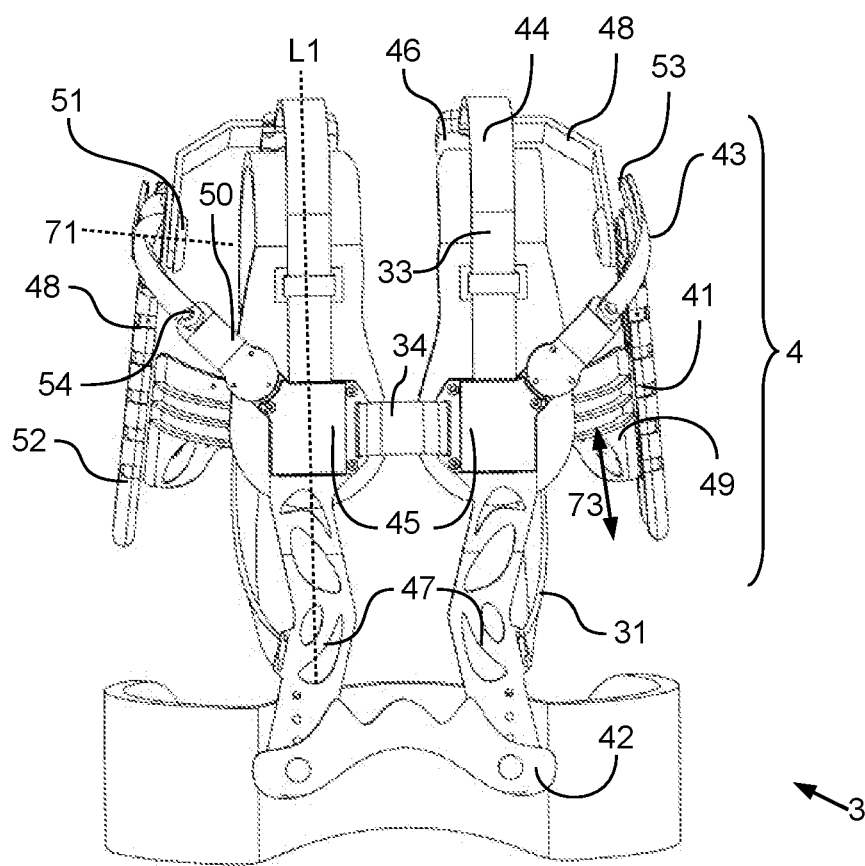
FIG. 5 schematically shows a rear-view of the example of FIG. 4 according to one embodiment of the present invention.
Figure 6:
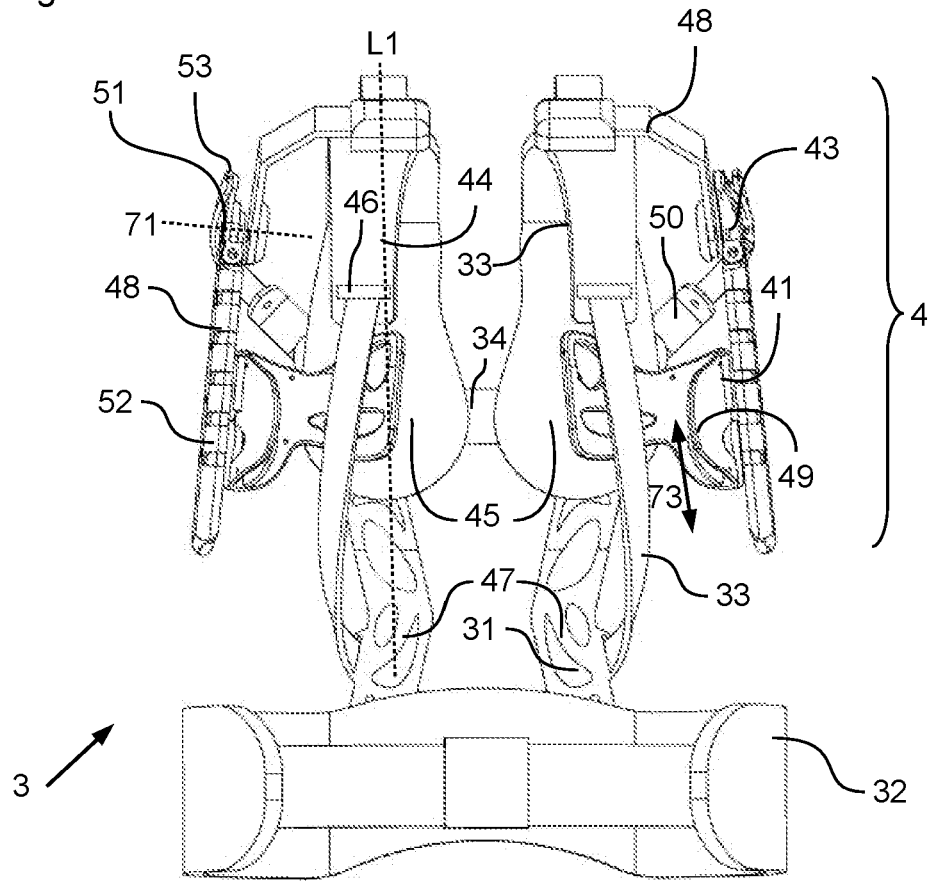
FIG. 6 schematically shows a front-view of the example of FIGS. 4 and 5 according to one embodiment of the present invention.

As illustrated in more detail in FIGS. 4-6, the user 1 in the example of FIGS. 1 and 2 is provided with a wearable support device 3 which reduces the musculoskeletal load on parts of the body sensitive to physical discomfort. More specifically, the wearable support device 3 transfers at least a part of the load from the arm 11 to another part of the body 10 while bypassing the musculoskeletal structure of parts of the body between the point where the arm 11 is attached to the body, i.e. the shoulder joint, and the other part of the body, in this example the hips 17. The wearable support devices allows the support device to follow the biological movement of the human shoulder, which moves up as the arm is moved up in the sagittal body plane. Not only does this reduce discomfort over long term usage, but also reduces complexity, making the device more suitable for commercialization.

Figure 3:
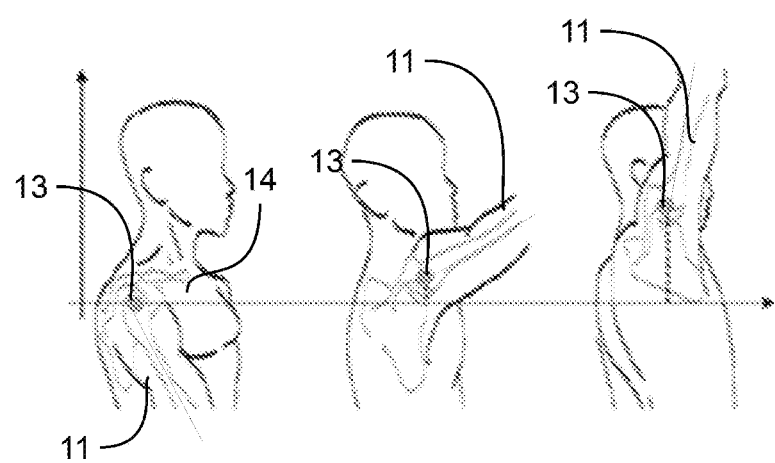
FIG. 3 schematically shows a side-view of a human torso, which illustrates movement of the center of rotation of an arm as a function of the orientation of the arm relative to the body according to one embodiment of the present invention.

This will be explained in more detail with reference to the example of FIGS. 4-6. The wearable support device 3 shown therein comprises a force-balancing support 4 for a movable arm. Although in the example of FIGS. 1 and 2 the force-balancing support is used for a human arm, it will be apparent that the force-balancing support can be used with any type of movable arm and is especially suited for a movable arm attached to a base and rotatable around a movable rotation point (e.g. shoulder joint) which is movable relative to the base (e.g. lower part of the human body). The force-balancing support may thus be used in wearable support devices for non-human animals or to support a movable arm in a mechanical apparatus, such as a robot. In particular, use of the support 4 is particularly advantageous if the position of the rotation point relative to the base is at least partially coupled to an orientation of the movable arm relative to the base. FIG. 3 shows, as an example, how the rotation point 13 of the human arm 11 moves when the arm is rotated to be oriented e.g. upwards, in particular when the upper arm is moved from pointing downwards (FIG. 3 *a*) a horizontal (FIG. 3 *b*), i.e. perpendicular to the longitudinal direction from the base to the rotation point, direction upwards to a vertical direction (FIG. 3 *c*), i.e. at least partially oriented in the elongated of this longitudinal direction.

As shown in FIGS. 4-6, the support 4 comprises an arm attachment 41 connectable to the movable arm. The support 4 comprises a base attachment 42 at a distance from the arm attachment, for attaching the support 4 to the base. The arm attachment 41 is at least rotatable around a center of rotation 43 of which a position is movable relative to the base attachment 42.

To provide this movability, the shown example of a support 4 is provided with a cantilever spring mechanism 44 which, when in use, at least partially transfers a force exerted on the arm attachment 41 by the movable arm, when coupled thereto, via the base attachment 42 to the base. The force is transferred via the cantilever spring mechanism 44 and hence the parts that connect the movable arm to the base are bypassed. Thus, the load on those parts is reduced. In case of animals, human or non-human, this allows reduce the musculoskeletal load and associated physical discomfort. In case of e.g. robots or other mechanical apparatuses this allows a reduction of mechanical power requirements on active actuators, such as electric or other motors, that actively move the arm relative to the base.

The cantilever spring mechanism 44 comprises a fixed, base-side, cantilever end 45 and a free, arm-side, cantilever end 46. The fixed cantilever end 45 is attached to the base attachment 42 and its position is fixated relative to the base attachment 42. The free, arm-side, cantilever end 46 is movable with respect to the base attachment, at least by suitable flexing of the cantilever spring mechanism 4. As shown, the arm attachment 41 is held suspended with respect to the base attachment 42 by the free end 46. The position of the center of rotation 43 is at least partially dependent on a position of the free cantilever end 46 which in turn is at least partially determined by a position of the arm attachment 41.

The cantilever spring mechanism allows to follow a complex movement of an arm since if arm attachment 41 is coupled to the movable arm, the moving arm will displace the arm attachment, thereby bringing along a change in position of the free cantilever end 46 and hence the center of rotation 43.

Said differently the force balancing support 4 constitutes a flexible frame (or cantilever spring or body shaped spring), of which the base is attachable to a mechanical 'ground' (e.g. torso in case of a human), and the free end is connected to an arm assembly through a rotational hinge.

It will be apparent that the cantilever spring mechanism 44 not only stores energy but allows to transfer load directly to the base bypassing the structure between the movable arm and the base, while following the movement of the rotation point of the arm.

Although the invention is not limited thereto, this is particularly advantageous in case of force-balancing an arm of a living being, especially a human arm where the human shoulder moves up as the arm is moved up in the sagittal body plane, as illustrated in FIG. 3. Not only does this reduce discomfort over long term usage, but also reduces complexity.

An amount of compensating force exerted by the cantilever spring mechanism on the arm attachment is determined by an amount of flexing of the cantilever spring mechanism. Thus, when the arm attachment 41 is displaced, i.e. by a force acting on it and accordingly the amount of flex increases or decreases relative to a neutral position, the cantilever spring mechanism will provide a compensating force to the center of rotation, and hence the arm which reduces the load thereon.

It will be apparent that a variety of shapes and implementations of the cantilever spring mechanism are possible. For instance, in the example, the cantilever spring mechanism comprises a continuous cantilever spring extending between the base-side cantilever end 45 and the free cantilever end 46. In this example, this is a blade or leaf spring, which allows to provide a compact support with a limited number of mechanical parts.

Additionally, this allows a modulation of the cantilever spring mechanism spring characteristics in a simple manner, e.g. by varying the thickness of the blade spring over a length thereof between the free cantilever end and the fixed cantilever end, to increase or reduce the stiffness locally, introducing local weakenings (e.g. holes or cavities) to make the lead spring weaker, and more generally to control displacement/curvature in off-axis direction of loading or to curve the spring around the body for a better fit and desirable out-put characteristics.

However, the cantilever spring mechanism may likewise comprise a series of discrete cantilever spring elements, such as a series of beams or plates resiliently linked to each other. In such a case, the spring characteristics may be modulated over the length thereof by varying the stiffness of (the links between) the individual elements.

Referring to FIG. 6, the example shown therein comprises for example a series of discrete cantilever spring elements 60, in this example plates 60 which are connected by pivot joints 62 to be rotatable around a pivot axis 63 perpendicular to the longitudinal direction of the cantilever spring mechanism, from fixed end 45 to free end 46. As shown more clearly in FIG. 8, in this example the joints are provided with a coil spring which operates as a torsion spring and provides a counter force when the element 60 is pivoted relative to the directly adjacent element. It will be apparent that springs with different spring constants may be used for different joints to modulate the flexing of the cantilever spring mechanism.

Figure 7:
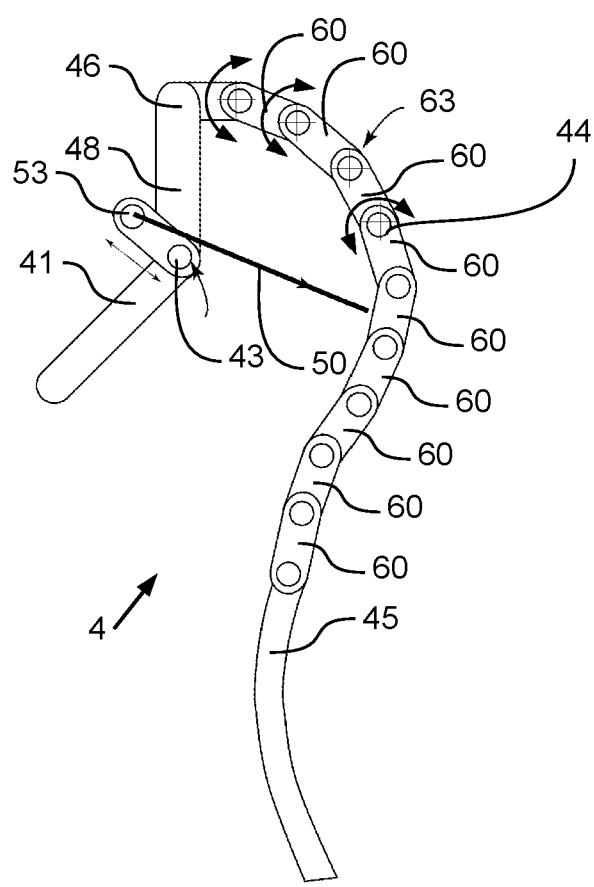
FIG. 7 shows a side-view of a second example of an embodiment of a force-balancing support according to one embodiment of the present invention.

In the examples of FIGS. 7 and/or 8 the force balancing support 4 is provided with an arm attachment 41 which can rotate around a center of rotation 43. Like the example of FIGS. 4-6, the arm attachment 41 is attached to the free cantilever end 46 by a rigid arm 48 which projects from the free cantilever end 46 towards the center of rotation 43.

As shown in FIGS. 4-6, the arm attachment 41 is attached to a lever arm which extends away from the arm attachment 41, from the center of rotation 43 to a lever end 53. Via the lever arm, torque can be applied to the arm attachment 41 by a member which couples the lever end 53 to the base attachment. In the shown example, a strap 50 is attached to the lever arm and the base attachment, but it will be apparent that another flexible elastic or non-elastic member, e.g. a coil spring, that attaches the lever to the base attachment or the base may be used to exert torque. More specific, when the movable arm 3 moves, this will result in the center of rotation pivoting around the pivot point where the lever arm is attached, and hence exerting torque on the free-end 46, which in turn will exert torque on the center of rotation that compensates, at least partially, for the forces exerted on the arm attachment and hence on the movable arm.

The lever arm thus provides for a pivot system that allows a complex movement of rotational and/or translational, e.g. linear components. In particular, the lever end 53 presents a pivot point, which combines with the pivot point of the center of rotation to allow the complex movements of the arm attachment and compensate for force. The support thus has an arm assembly, formed in the example by the arm attachment 41 and the lever arm, with at least two pivots, of which one is used to connect the free end 46 and another is attached to the mechanical "ground", e.g. using the strap, in this example the base attachment 42 or the base.

In which the strap torques the flexible frame as the arm assembly is displaced from its rest position, which is defined as the position in which the energy stored in the flexible frame is minimum.

In the shown example, the lever arm is coupled to a point 54 of the base attachment, via a pivot at the pivot end 53.

A preloading string 50 is attached to the rigid arm and an element at a distance therefrom to preload, and hence flex the cantilever mechanism. It will be apparent that in this example the preloading string 50 advantageously fixates the distance of the center of rotation 43 to the point where the preloading string 50 is attached to the element, and hence creates a hinge point which allows the cantilever spring mechanism to exert torque onto the center of rotation, which allows to compensate for torque exerted by the movable arm.

Figure 8:
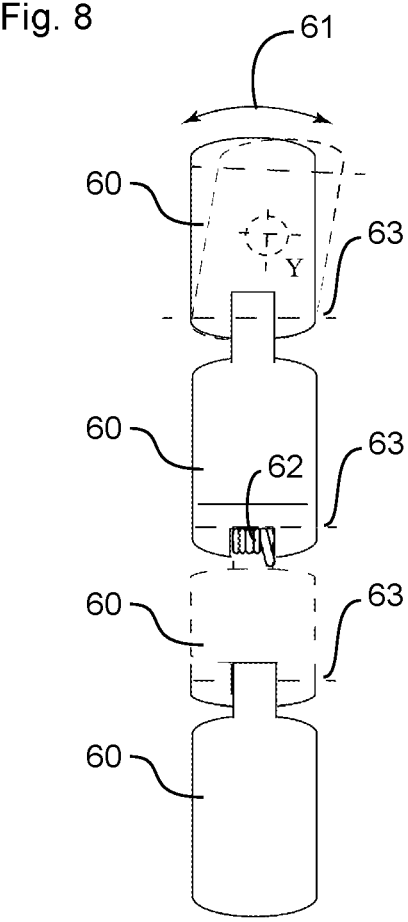
FIG. 8 shows a rear-view of an example of a discrete cantilever spring mechanism suitable for the second example according to one embodiment of the present invention.

As shown in FIG. 8 with arrow 61, the elements 60 may be pivotable around another axis perpendicular to the longitudinal direction and the first pivot axis, to add an extra degree of freedom and provided a further adaptability to the morphology and movements of the arm.

It will be apparent that the cantilever spring mechanism may have any shape suitable for the specific implementation and that the center of rotation may be at any position suitable for the specific implementation.

For example, the center of rotation is movable relative to the base attachment in at least one of a longitudinal direction from the arm attachment to the base attachment, a lateral direction perpendicular to the longitudinal direction, a transversal direction perpendicular to the longitudinal direction and the lateral direction. This allows a freedom of movement that is suitable for complex movements of the arm.

For example, the cantilever spring mechanism may be capable of flexing in at least two of the longitudinal direction, lateral direction and transversal direction. Thereby the freedom of movement can be obtained in a simple manner and forces from different directions be transferred effectively. Additionally, the free cantilever end can be movable by suitable torsion of the cantilever spring mechanism. For instance, the cantilever spring mechanism may exhibit torsion spring characteristics and can be resiliently twisted. This adds an additional degree of freedom.

In the example of FIGS. 4-6, the center of rotation of the arm attachment lies outside the cantilever spring mechanism, i.e. this is a virtual center of rotation. The center of rotation 43 of the arm attachment 41 lies at a distance from a base-side cantilever end 45 of the cantilever spring mechanism and from the free cantilever end 46. This creates a large degree of freedom for the movement of the center of rotation.

More specifically, in the example, the cantilever spring mechanism is curved around the center of rotation 43 of the arm attachment 41. This allows to locate the center of rotation 43 such that the cantilever spring mechanism is sufficiently spaced apart from the parts to be bypassed avoids that the cantilever spring mechanism comes in contact and directly exerts a force on those parts. Preferably the curvature is such that the joint between the movable arm and the body fits into the curvature. Thereby, the cantilever spring mechanism 44 preserves a significant freedom of movement for the movable arm. In the example, as more clearly seen in FIGS. 1 and 2, the human shoulder fits inside this curvature and the center of rotation of the human shoulder approximately overlaps with the center of curvature of the spring.

Figure 9:
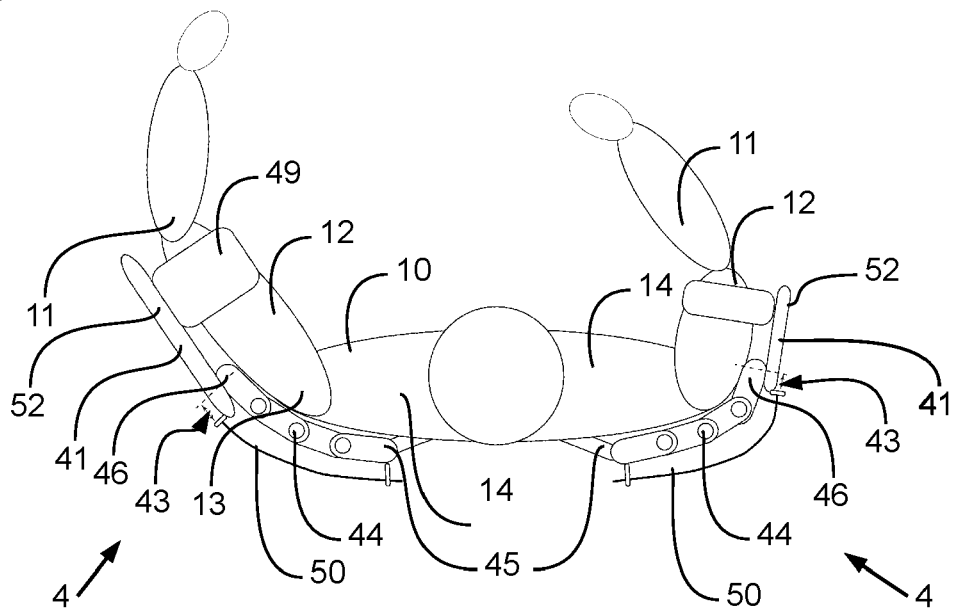
FIG. 9 shows a top view of a human user wearing another example of a wearable support device according to one embodiment of the present invention.

However, it will be apparent that the center of rotation may be located on the cantilever spring mechanism, for example in case of a blade spring which instead of extending, in a direction between the base attachment 42 and the center of rotation 43 beyond the center of rotation, the spring may extend between the base attachment 42 and the center of rotation 43, e.g. passing under the arm pit in case of being used by a human. FIG. 9 shows for example an implementation in which the cantilever spring mechanism 44 does not extend over the shoulder 14 of the user, but rather extends at the rear of the users body 10, between the fixed end 45 and the free end 46 and where the center of rotation coincides with the free end 46. As shown, in this example a movement of the arm 11 will bring the two ends 45,46 to each other and increase the curve of the cantilever spring mechanism 44. A pretensioner 50, e.g. strap, connects the free end 46 to the fixed end 45 at the side opposite to the center of curvature, and provides a preloading force which counter acts the force exerted by the arm 11.

As more clearly seen in FIGS. 5 and 6, the center of rotation of the arm attachment may lie outside a plane L1 in which the cantilever spring mechanism extends. Thereby space is created in which the joint between the movable arm and the body can be accommodated and good correspondence between the movement of the center of rotation 43 of the arm attachment 41 and the rotation point of the movable arm be obtained.

The cantilever spring mechanism may be coupled in any manner suitable for the specific implementation to the base attachment and the arm attachment, such as directly or indirectly. In the example of FIGS. 4-6, for instance, the force-balancing support 4 comprises a frame 47 coupling the base attachment 42 to the cantilever spring mechanism 44. The frame 47 is more rigid than the cantilever spring mechanism. In this example, the frame allows to provide a high degree of stiffness, and hence additional support, to parts of the body and avoid that the cantilever spring mechanism, instead of flexing freely, presses to those parts and exerts a force thereon.

In FIGS. 4-6, the arm attachment 41 is at a distance of the free cantilever end 46. The arm attachment 41 is attached to the free cantilever end 46 by a rigid arm 48 which projects from the free cantilever end 46 towards the center of rotation 43. Thereby the center of rotation, provided by a rotational or swivel joint between the arm attachment 41 and the rigid arm 48 can be located close to the rotation point of the movable arm and hence a good corresponding between their movements be obtained. In this respect, the right arm may project out of the plane L1 in which the cantilever spring mechanism extends, as more clearly shown in FIGS. 5 and 6, which allows a compact design of the support.

The cantilever spring mechanism 44 may preloaded. Thereby, the initial position of the center of rotation can be aligned as desired, for example to align to the body of the human shoulder, and hence improving the correspondence between the center or rotation and the rotation point of the arm. Especially in case of a leaf spring, this allows a mechanically simple construction that provide an effective force balancing for complex movements, e.g. that follows the natural movement of the human shoulder.

Although the preloading may be implemented in any suitable manner, a simple and effective preloading may be provided by a strap 50 which is, directly or indirectly, attached to the cantilever spring mechanism at two points at a distance from each other and which strap can be tied to preload the cantilever spring.

The arm attachment 41 may be implemented in any manner suitable for the specific implementation to be at least rotatable relative to the base attachment.

In the example shown in FIGS. 4-6, for instance, the arm attachment comprises a hinge mechanism 51 at the center of rotation and attached to the cantilever mechanism (in this example via rigid arm 48). An arm rest 49 is connected thereto via an arm member 52.

The hinge mechanism 51 has one or more pivot axis 71,72 for pivoting the arm member 52. The hinge mechanism has a first pivot axis 71 and a second pivot axis 72 at an angle, such as perpendicular, to the first pivot axis, and the rigid arm 48 holds the hinge mechanism 51 in position relative to the free end cantilever end 43. The hinge mechanism thus provides for two degrees of freedom for the movable arm, and in case of a human arm allow lifting the arms up in the sagittal plane and transverse plan using the sagittal hinge 1 and transverse hinge 72 respectively.

The arm attachment 41 further has an arm rest 49 at a distance of the center of rotation.

The position of the arm rest 49 relative to the pivot axis may be adaptable. As indicated with arrow 73, the arm rest 49 can be moved away from or closer to the hinge mechanism 51 to compensate for misalignments. In this example, the arm member 52 is provided with a slide over which the arm rest 49 can be slid into the desired position and then the position be locked. Alternatively, the arm rest 49 can be allows to move linearly during use thereby allowing an automatic correction of the alignment in case e.g. an insufficient correspondence between the movement of the center of rotation and the rotation of the movable arm.

Thus, the support 4 comprises a mechanism that allows rotational as well as linear translation of the arm rest and hence a large freedom of movement when the 'arm rest' is connected to the external 'arm'.

The hinge mechanism and the moving arms rest may be passively powered, such as using a spring or other passive actuator. Thereby, a mechanically simple and/or compact support can be obtained.

In the examples of FIGS. 1-5, the force balancing support is used in a wearable support device 3. The wearable support device 3 is wearable by a human being, however it will be apparent that the wearable support device 3 may be adapted to be wearable by other types of living beings, i.e. non-human animal by adapting the dimension in a suitable manner to the morphology of the species in question.

As shown, the wearable device 3 comprises a harness 32 for attaching the device 3 to a body of the animal and one or more supports 4 to transfer force exerted by an arm-shaped limb of the animal onto a rotation point thereof to another part of the body while bypassing the parts of the body between the rotation point and the other part of the body.

The other part of the body can be a lower part of the body below at least one of the group consisting of: shoulders, chest, thorax, nombril, hips, legs. This allows to bypass the parts of the body between the arm and the mentioned part of the body and hence reduce musculoskeletal stress on the bypassed part. It is particularly advantageous is the other part of the body is a part of the back below a vertebra, the vertebra being selected out of the group consisting of: C7, T12, T11, T10, T9, T8, T7, T6, T5, T4, T3, T2, T1, L1, L2, L3. This allows to reduce the load on selected parts of the spine which is a frequent cause of physical complaints.

The wearable support device may be suitable, as shown, for an animal with a symmetrical body, e.g. such as the human body. As shown, the wearable support device 3 may comprise two supports, each at a respective side of a symmetry axis of the body to support a respective arm attachment connectable to respective arm-shaped limb thereof.

In the example, the harness is formed by force balancing supports 4, each at a respective side of the symmetry axis of the human body and spaced apart to allow the neck to be positioned there between. The supports 4 are attached by a frame 47 to a base attachment 42 which, in use, is on the users back and more specifically the base attachment 42 is attached to the lower part of the back with a belt 32 which extends when fastened around the hips of the user. As shown, the frame 47 consists of parallel elongated strips which extend from the base attachment 42 to the supports 4 and are connected to each other at and by the base attachment 42 and at the joint with the supports 44 by a transfers strip 34. The harness is provided with straps 33 which connect the free cantilever end 46 to the frame 47. When worn, the free cantilever end will be at the front of the torso 10 and the frame at the back. The straps 47 thus allows to fixate the harness onto the torso while the belt 32 ensures the support onto the hips.

The support may be used to support a movable arm of a mechanical apparatus, such as an autonomous or semi-autonomous robot, e.g. a humanoid or non-humanoid. The mechanical apparatus may for example be a factory equipment, such as an industrial robot. Use of the support allows to implement a movable arm that can make complex movements with active actuators of a limited capacity since the support provides a passive actuator with a significant freedom of movement for the movable arm. In particular, the support can compensate for static forces and hence the need to provide the active actuators with sufficient power to compensate for such forces can be reduced if not obviated.

The mechanical apparatus may comprise a movable arm and a base to which the movable arm is attached. The apparatus may e.g. comprise an active actuator for moving the arm relative to the base. The arm may rotatable around a movable rotation point which is movable relative to the base. For example, the arm may be attached to a body which can rotate or move linearly relative to the base. The arm may be provided with a support which is coupled to the arm and the base to at least partially compensate for a force exerted by the movable arm on the rotation point of the arm.

In the foregoing specification, the invention has been described with reference to specific examples of embodiments of the invention. It will, however, be evident that various modifications and changes may be made therein without departing from the broader scope of the invention as set forth in the appended claims.

For instance, although the shown example is implemented as an 'exoskeleton', that is a device that augments the performance of an able-bodied wearer, the wearable support device may likewise be implemented as an 'orthosis', that is a device that is used to assist a wearer with a limb pathology, e.g. for curative treatment, prophylactic treatment or palliative treatment such as the alleviation of pain symptoms of the wearer.

Likewise, although the examples are illustrated as wearable by a human being, the wearable support device may likewise be implemented as an exoskeleton or orthosis for other species, such as in a veterinary orthosis or exoskeleton.

For example, the connections as discussed herein may be any type of connection suitable to transfer forces from or to the respective parts, for example via intermediate elements. Accordingly, unless implied or stated otherwise, the connections may for example be direct connections or indirect connections.

Furthermore, although in the examples a cup-shaped arm rest has been shown which accommodates a human upper arm 12, it will be apparent that e.g. a cuff or other attachment may be used depending on the arm to be coupled to and that the arm rest may be permanently or releasably connected to the movable arm.

Also, it will be apparent that the support may be implemented to compensate a suitable force and that this compensation may be partially or completely. For example, the support may balance for dynamic or static forces and e.g. support the weight of the arm or the weight of the arm with a tool by compensating for gravity.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A force-balancing support for a movable arm, which movable arm is attached to a base and rotatable around a movable rotation point, movable relative to the base, the support comprising:
    an arm attachment connectable to the movable arm;
    a base attachment at a distance from the arm attachment, for attaching the support to the base;
    the arm attachment being at least rotatable relative to the base attachment, around a center of rotation of which a position is movable relative to the base attachment;
    a cantilever spring mechanism for at least partially transferring a force exerted on the arm attachment by the movable arm, when coupled thereto, via the base attachment to the base,
    the cantilever spring mechanism comprising:
        a fixed, base-side, cantilever end attached to the base attachment of which a position is fixated relative to the base attachment, and
        a free, arm-side, cantilever end which is movable with respect to the base attachment at least by suitable flexing of the cantilever spring mechanism and by which the arm attachment is held suspended with respect to the base attachment,
        the position of the center of rotation being at least partially dependent on a position of the free cantilever end which in turn is at least partially determined by a position of the arm attachment, wherein the force balancing support comprises an arm assembly formed by the arm attachment and a lever arm which extends away from the arm attachment from the center of rotation to a lever end, which arm assembly comprises at least two pivots, of which one pivot is the center of rotation which is used to connect to the free cantilever end and another pivot is via a member attached to the base attachment.

2. The support of claim 1, wherein an amount of compensating force exerted by the cantilever spring mechanism on the arm attachment is determined by an amount of flexing of the cantilever spring mechanism.

3. The support of claim 1 wherein the center of rotation of the arm attachment lies outside the cantilever spring mechanism.

4. The support of claim 1 wherein the center of rotation of the arm attachment lies at a distance from a base-side cantilever end of the cantilever spring mechanism and from the free cantilever end.

5. The support of claim 1 wherein the cantilever spring mechanism is curved around the center of rotation of the arm attachment.

6. The support of claim 1 wherein the center of rotation of the arm attachment lies outside a plane in which the cantilever spring mechanism extends.

7. The support of claim 1 comprising a frame coupling the base attachment to the cantilever spring mechanism, the frame being more rigid than the cantilever spring mechanism.

8. The support of claim 1 wherein the arm attachment is at a distance of the free cantilever end.

9. The support of claim 1 wherein the cantilever spring mechanism comprises a continuous cantilever spring extending between the base-side cantilever end and the free cantilever end, such as a blade spring.

10. The support of claim 1 wherein the cantilever spring mechanism is preloaded.

11. The support of claim 1, comprising a strap, directly or indirectly, attached at two points at a distance from each other to the cantilever spring mechanism, which strap can be tied to preload the cantilever spring.

12. The support of claim 8, wherein the arm attachment is attached to the free cantilever end by a rigid arm.

13. The support of claim 1 wherein the arm attachment comprises:
    a hinge mechanism at the center of rotation and attached to the cantilever mechanism;
    an arm rest at a distance of the center of rotation;
    an arm member connecting the arm rest to the hinge mechanism;
    the hinge mechanism having at least one pivot axis for pivoting the arm member.

14. The support of claim 13, wherein; the hinge mechanism comprises a first pivot axis and a second pivot axis at an angle to the first pivot axis; the arm attachment is attached to the free cantilever end by a rigid arm and the rigid arm fixates the hinge mechanism relative to the free end cantilever end.

15. The support of claim 13, wherein the position of the arm rest relative to the at least one pivot axis is adaptable.

16. The support of claim 1 wherein the cantilever spring mechanism comprises a series of discrete cantilever spring elements.

17. The support of claim 1 wherein the cantilever spring mechanism comprises spring characteristics which vary over a length of the cantilever spring mechanism between the free cantilever end and the fixed cantilever end.

18. The support of claim 1, wherein the center of rotation is movable relative to the base attachment in at least one of:
    a longitudinal direction from the arm attachment to the base attachment;
    a lateral direction perpendicular to said longitudinal direction;
    a transversal direction perpendicular to the longitudinal direction and the lateral direction.

19. The support of claim 18, wherein the cantilever spring mechanism is capable of flexing in at least two of the longitudinal direction, lateral direction and transversal direction.

20. The support of claim 1, wherein the free cantilever end is further movable by suitable torsion of the cantilever spring mechanism.

21. The support of claim 20, wherein the cantilever spring mechanism exhibits torsion spring characteristics and can be resiliently twisted.

* * * * *